Patented May 16, 1950

2,507,983

UNITED STATES PATENT OFFICE 2,507,983

PAINT REMOVER COMPOSITION

Lester E. Kuentzel, Wyandotte, Mich., assignor to Wyandotte Chemicals Corporation, Wyandotte, Mich., a corporation of Michigan No Drawing. Application November 1, 1945, Serial No. 626,172

1 Claim. (Cl. 252—144)

This invention relates to compositions for removing or stripping paint, varnish, enamel, lacquer and the like from surfaces of metal, wood, glass, fabrics or brushes. The prime objectives of my invention are to provide a paint remover which has high stripping power, i. e. capable of loosening the coating in a minimum period of time, and is thixotropic, i. e. having the property of being fluid when agitated and gelled when immobile. Both of these properties are highly desirable in a paint remover since they contribute both to the reduction of time and labor required for stripping, as well as to the convenience and efficiency of application of remover to surfaces wherein there is a tendency to flow and drain under gravity.

Chlorinated aliphatic hydrocarbon solvents have heretofore been used and formulated to a considerable extent as ingredients of paint removers. I have made the discovery that the presence of a small amount of water or certain acids greatly improves the stripping power of such chlorinated solvents; and that the presence of both water and acid imparts still greater stripping power.

The water ingredient of the paint remover embodying the principle of my invention is believed to function as a synergistic chemical agent in the nature of a solvent activator, which results in the remarkably enhanced stripping power of the chlorinated solvent. By the same token, the selected acids impart an activating action to the solvent. The fact that some organic and mineral acids depress, rather than accelerate, the paint stripping action if the chlorinated hydrocarbon solvents, demonstrates the unusual and unpredictable nature of the discovery upon which my invention is founded.

I have also discovered that where methylene chloride is used as the chlorinated aliphatic hydrocarbon solvent, with the presence of a relatively small amount of water and the addition of methyl cellulose and a blending agent which is a co-solvent for the methylene chloride and for the methyl cellulose, then the desired thixotropic property is imparted to the paint remover or stripping composition. In my copending application Serial No. 509,121, filed November 5, 1943, now U. S. Pat. No. 2,433,517, issued Dec. 30, 1947, I have disclosed a paint remover formulation containing methylene chloride, methyl cellulose, water, and an amine, wherein the amine as a co-solvent, in addition to its paint solvent properties, functions as a blending agent for the methylene chloride and methyl cellulose, thus producing a thixotropic composition. The present application is accordingly a continuation-in-part of my aforesaid co-pending application Serial No. 509,121.

In addition to the objectives and advantages above noted, the paint remover compositions of my invention possess the highly beneficial properties of non-inflammability, low rate of evaporation, and removability or rinsibility by water rather than requiring a special after-solvent. After removing the paint or the like from the surface, my compositions also leave such surface, whether it be metal or wood, in such condition that it may be immediately refinished, since they do not produce corrosive action on most metals and do not raise the grain on wood.

To the accomplishment of the foregoing and related ends, the following description sets forth in detail a method of procedure whereby those skilled in the art may be enabled readily to understand and practice the principle of my invention.

I have determined that the following chlorinated aliphatic solvents are best suited to function and operate as the solvent ingredient in the compositions embodying the principle of my invention:

Methylene chloride
Ethylene dichloride
1,1,2-trichlorethane
1,1,2,2-tetrachlorethane
Chloroform that the following acids are those which are capable as activating agents for increasing the paint stripping power of the above mentioned solvents:

| Formic | Picric |
|---|---|
| Acetic | n-Propyl phosphoric |
| Propionic | Nitric |
| Salicylic | Benzoic |
| Butyric | Cinnamic |
| Carbolic | | and that the following aliphatic alcohols and ethers are best suited to function and operate as the blending agent in the compositions embodying the principle of my invention:

Methyl alcohol
Ethyl alcohol
Butyl alcohol
Ethylene chlorhydrin
Isopropyl alcohol
2 methyl 2, 4 pentanediol
Hexanol
Amyl alcohol
Ethylene glycol
Di-ethylene glycol mono-ethyl ether, or "Ethyl Carbitol"
Dibutoxyethane
Ethylene glycol monobutyl ether, or "Butyl Cellosolve"
Propylene glycol
Ethylene glycol mono-ethyl ether, or "Ethyl Cellosolve"

These blending agents function to do something more than merely promote the miscibility of the other ingredients, since they greatly improve the dispersion of, and promote the swelling of the fibers of the methyl cellulose when it is present, thus contributing to the achievement of the desired thixotropic property of the composition as a whole.

It is recognized that chlorinated hydrocarbon solvents in general, have the tendency to decompose after a period of time or to hydrolyze in the presence of moisture, light, and elevated temperatures, to form hydrochloric acid. However, such a possible latent or inherent presence of acid in the chlorinated hydrocarbon solvent is obviously not included within the purview of my invention, since not only does my invention contemplate the addition of an acid not inherently present or generated in the chlorinated hydrocarbon, but also, hydrochloric acid is one of those acids which have been found to depress rather than promote, the stripping power of the solvent.

The amount of water incorporated into the mixture selected from the above solvents, acids and blending agents, has been found to be critical. The amount of water should be no greater than that which is capable of going into solution with the remaining ingredients of the mixture, i. e., whereby the mixture will remain in a single phase. If more than this maximum amount of water is added, not only will an emulsion be formed which, on standing tends to separate out into layers (i. e. two phases), but also the stripping power of the composition will be decreased. In my preferred formulations, comprising methylene chloride, an acid and a blending agent selected from the above stated lists, and in which methyl cellulose is present as a thickening agent rendering possible the thixotropic properties of the composition, the amount of water present is found to be in the range of 0.01% to 6.0% by weight of the total composition. Below this range of water content, the enhanced stripping power is not obtained and above this range the thixotropic property is no longer maintained, nor is a single phase mixture achieved and maintained.

Methyl cellulose within the commercially designated viscosity range of 15 to 4000 c. p. s., appears to be unique in imparting thixotropic properties to the composition. Methyl cellulose having a methoxy content of about 32% is preferred. Methyl cellulose is insoluble and immiscible with the chlorinated aliphatic hydrocarbon solvent; but it is fairly soluble in water and acids. Whether the methyl cellulose fibers become truly dissolved or hydrated and dispersed is not definitely known. In the case of methylene chloride, the presence of an ingredient which is a co-solvent for the methylene chloride and the methyl cellulose containing water, such as an amine as disclosed in my aforesaid co-pending application Serial No. 509,121, or a blending agent selected from those hereinabove listed, is all important and critical in imparting the thixotropic properties to the composition.

Additional ingredients including an evaporation retardant, such as paraffin wax; and wetting agents, such as alkylated aromatic sodium sulfonates may also be incorporated to advantage into the composition. These wetting agents are of particular advantage because they impart easier removability of the paint remover composition by water, even when water-insoluble materials, such as paraffin wax, are present. Wetting agents of the alkyl aryl sulfonate type have been found to be quite satisfactory in the formulation of compositions embodying the principle of my invention. Specifically, alkyl aryl sulfonate wetting agents are available on the market under the trade names of "Santomerse D" and "Wetsit Concentrated." "Santomerse D" is a substantially 99% dodecylbenzene sodium sulfonate. "Wetsit Concentrated" is a proprietary alkyl aryl sulfonate containing a minor proportion of terpenes and about 20% water content. The alkyl and aryl groups of such latter form of alkyl aryl sulfonate are not definitely known or publicized, such information being the private property of the manufacturer of such product. "Wetsit Concentrated" is particularly suitable since it contains approximately 20% water and thus serves as a convenient means for adding the water ingredient to the composition, making it unnecessary to add water separately as there is enough water in such wetting agent to satisfy the formulation requirements.

Generally outlined, the paint remover compositions of my invention are combined or formulated by mixing together the chlorinated solvent, the methyl cellulose, the acid, the water, and the blending agent, in the order named and at room temperature. Melted paraffin wax, if present, is incorporated directly after the solvent.

The extraordinary improvement in the stripping power of the chlorinated solvent by the addition of small amounts of water is shown in the following Table I, where mixtures of methylene chloride and varying amounts of water were applied to painted test panels Nos. 14105 and 14109 made according to specifications as hereinafter referred to, and the time required to strip the paint coating from such panels duly noted:

Table I

| Percent by Weight of Water Added to Methylene Chloride | Stripping Power (time in seconds to completely loosen coating from panels) | |
|---|---|---|
| | 14105 | 14109 |
| 0.000 | over 10,000 | 9,000 |
| 0.003 | over 10,000 | 1,500 |
| 0.015 | 5,400 | 720 |
| 0.030 | 3,300 | 600 |
| 0.073 | 900 | 300 |
| [1] 0.15 | 480 | 150 |
| 5.00 | 500 | 150 |

[1] Saturated solution of water in methylene chloride.

The methylene chloride used in the mixtures of the foregoing Table I was first carefully distilled to remove any possible trace of water.

The pronounced activating effect of certain selected acids on the stripping power of the chlorinated solvent is illustrated in the following Table II where varying amounts of 100% glacial acetic acid were added to methylene chloride, and such mixtures similarly tested as in the case of Table I:

*Table II*

| Percent by Weight of Acetic Acid | Stripping Power (time in seconds to completely loosen coating from panels) | |
|---|---|---|
| | 14105 | 14109 |
| 0.000 | over 10,000 | 9,000 |
| 0.2 | 1,500 | 180 |
| 1.0 | 300 | 130 |
| 9.09 | 10 | 80 |
| 16.66 | 10 | 100 |
| 28.6 | 20 | 180 |
| 37.5 | 40 | 240 |
| 50.0 | 40 | 250 |
| 62.5 | 60 | 360 |
| 83.3 | 60 | 930 |
| 95.2 | 160 | 1,620 |
| 100.0 | 180 | 2,700 |

The remarkable ability of relatively small amounts of water and acid to enhance or accelerate the stripping power of the chlorinated solvent, is further shown in the following Table III where mixtures of methylene chloride, with water and salicylic acid (added separately and jointly), were applied to U. S. Navy Aeronautical Specification test panels 72 and 75E as recited in Navy Aeronautical Specification C-113, Amendment-2; and United States Army Air Force test panels Nos. 14105 and 14109, as recited in Army Air Force Specification No. 14119. The detailed description of these stripping test panels is set forth in my co-pending application Serial No. 509,121 and need not be here repeated.

*Table III*

| Methylene Chloride, c. c. | Salicylic Acid, gms. | Water, c. c. | Stripping Power (time in seconds to completely loosen coating from panels) | | | |
|---|---|---|---|---|---|---|
| | | | 72 | 75E | 14105 | 14109 |
| 10 | | | 600 | [1] Over 10,000 | [1] Over 10,000 | [1] Over 10,000 |
| 10 | | 0.01 | 120 | 1,200 | | |
| 10 | 0.1 | | 240 | 1,200 | 1,800 | 1,800 |
| 10 | 0.1 | 0.01 | 60 | 120 | 720 | 720 |
| 10 | 0.1 | 0.1 | | | 30 | 260 |

[1] Coating softened, but not loosened.

It has been found that the stripping power of methylene chloride is especially enhanced by the addition of water and a monocarboxylic acid of 1 to 3 carbon atoms, viz: formic, acetic and propionic acids. Thus, a composition of methylene chloride 10 parts, formic acid 0.1 part and water 0.1 part (all parts by volume) completely loosened the coating on a #14105 test panel in 10 seconds and on a #14109 test panel in 50 seconds.

A composition containing methylene chloride 10 parts, acetic acid 0.1 part and water 0.1 part (all parts by volume) completely loosened the coating on a #14105 test panel in 20 seconds and on a #14109 test panel in 110 seconds.

A composition of methylene chloride 10 parts, propionic acid 0.1 part and water 0.1 part (all parts by volume) completely loosened the coating on a #14105 test panel in 30 seconds and on a #14109 test panel in 130 seconds.

The following examples of formulations of ingredients further serve to illustrate my invention, such examples being given by way of illustration, rather than limitation:

*Example 1*

[Formulation No. 1605]

| | Amount | Percent by Weight | Percent Water Content |
|---|---|---|---|
| Methylene Chloride | 100 ml | 85.78 | |
| Paraffin | 4 g | 2.57 | |
| Methyl Cellulose (4000 c. p. s.) | 1.5 g | 0.95 | |
| Acetic Acid (Glacial) | 1 ml | 0.63 | |
| Formic Acid (90%) | 1 ml | 0.77 | .077 |
| "Wetsit Concentrated" | 5 ml | 3.20 | .64 |
| Methanol | 12 ml | 6.10 | |
| | | 100.00 | .717 |

The foregoing constituents were combined by mixing together in the above given order at room temperature, with the exception of the paraffin wax which was first melted. The resulting composition is amber in color and clear at temperature above 75° F., becoming slightly milky to opaque at lower temperatures as the wax precipitates. The composition is thixotropic and may be applied by dipping, brushing, swabbing or spraying. Immediately upon application to the surface from which the paint, varnish, enamel, or lacquer is to be removed, the paint remover composition sets in the form of a weak gel, so that it can thus be readily applied to vertical, sloping, rounded, and underside surfaces, such as those encountered in treating walls, ceilings, furniture, machine parts, aircraft, watercraft and the like.

The following exemplary formulation is one in which the acid, blending agent and wetting agent constituents have been changed as compared to that of Example 1:

*Example 2*

[Formulation No. 1665]

| | Amount | Per Cent by Weight |
|---|---|---|
| Methylene Chloride | 100 ml | 80.17 |
| Paraffin | 4 g | 2.41 |
| Methyl Cellulose | 1.3 g | 0.78 |
| Propionic Acid | 12 ml | 7.16 |
| Isopropyl Alcohol | 10 ml | 4.66 |
| "Santomerse D" | 4 g | 2.41 |
| Water | 4 ml | 2.41 |
| | | 100.00 |

The foregoing constituents were combined in the same manner as in Example 1. The resulting composition is similar in physical characteristics and properties as that of the composition of Example 1 with the exception that the paraffin wax remains in solution at a temperature of 74° F. and above.

By omitting the methyl cellulose and blending agent, the thixotropic property is correspondingly removed, but the stripping power remains equally high. The following exemplary formulation has the methyl cellulose and blending agent omitted. It is well suited for use as an immersion or tank type of paint remover.

Example 3

[Formulation No. 1666]

|  | Amount | Per cent by Weight | Per cent Water Content |
|---|---|---|---|
| Methylene Chloride | 100 ml | 94.29 |  |
| Paraffin | 1 g | .70 |  |
| Acetic Acid (Glacial) | 1 ml | .70 |  |
| Formic Acid (90%) | 1 ml | .79 | .079 |
| "Wetsit Concentrated" | 5 ml | 3.52 | .704 |
|  |  | 100.00 | .783 |

The foregoing composition is a non-thixotropic, light amber, water-thin liquid for use in tank stripping.

If desired, a small amount of distinctive coloring agent, such as "Patent Blue" dye may be added to any one of the compositions of the foregoing examples.

As previously herein indicated, an amine such as disclosed in my aforesaid pending application Serial No. 509,121, also functions as a blending agent or co-solvent for the methylene chloride, methyl cellulose and water. The following formulation, wherein cyclohexylamine is employed in place of one of the alcohol or ether blending agents herein specified, thus also produces a thixotropic composition.

Example 4

[Formulation No. 529]

|  | Amount | Per cent by Weight |
|---|---|---|
| Methylene Chloride | 100 ml | 64.04 |
| Paraffin | 1 g | 0.48 |
| Methyl Cellulose | 2 g | 0.96 |
| Cyclohexylamine | 70 ml | 29.02 |
| Water Glass | 1 ml | 0.68 |
| Water | 10 ml | 4.79 |
| *"Patent Blue" Dye | 0.06 g | 0.03 |
|  |  | 100.00 |

* "Patent Blue" dye is also known as "Xylenblau"; for its chemical constituency, refer to "Farben-Chemie" Fierz-David and Blangey (J. N. Edwards, 1944), p. 286.

The foregoing composition is likewise thixotropic as in the case of the compositions of Examples 1 and 2 above and is blue in color. The cyclohexylamine constituent, being a co-solvent for the methylene chloride and the methyl cellulose, acts as a blending agent.

Another formulation in which phenol or carbolic acid is employed as the acid ingredient, is as follows:

Example 5

[Formulation No. 2346]

|  | Amount | Per Cent by Weight | Per Cent Water Content |
|---|---|---|---|
| Methylene Chloride | 100 cc | 80.96 |  |
| Paraffin Wax | 4 g | 2.43 |  |
| Methyl Cellulose (1,500 c. p. s.) | 1 g | 0.61 |  |
| "Wetsit Concentrated" | 5 cc | 3.03 | 0.606 |
| Water Glass | 1 cc | 0.85 |  |
| Phenol (solid) | 20 g | 12.12 |  |
|  |  | 100.00 | 0.606 |

The remarkable stripping ability of the composition of my invention as exemplified by the foregoing examples, is illustrated by the following test results:

| Composition | Stripping Power (time in seconds required to loosen coating completely from the following numbered test panels) | | | | |
|---|---|---|---|---|---|
|  | 72 | 70E | 75E | 14105 | 14109 |
| Example 1 | 10 | 15 | 10 | 40 | 40 |
| Example 2 | 10 | 10 | 10 | 50 | 50 |
| Example 3 | 10 | 15 | 10 | 40 | 40 |
| Example 5 | 60 | 45 | 30 | 20 | 150 |

The amount of water present in the paint remover formulations embodying the principle of my invention, particularly where methyl cellulose is present, is preferably not over 6.0% by weight of the total composition. Above this limit a single phase mixture cannot be obtained, and moreover, the stripping power is not further enhanced. The acid constituent is preferably maintained in the range of 0.1 to 50% by weight of the total composition, since this range also is the one in which the optimum benefit to the stripping power on the majority of paints, varnishes, lacquers and enamels is obtained. The chlorinated solvent range is from 50 to 95%.

The paint remover compositions of my invention being water rinsible, may be easily and efficiently removed after stripping function is completed, simply by flushing or scrubbing off with water.

Equivalent modes of practicing my invention may be followed provided that they are within the scope and purview of the appended claim.

I, therefore, distinctly claim and particularly point out as my invention:

A paint remover having thixotropic properties and consisting of the following ingredients present in approximately the respectively listed proportions by weight:

| | Per cent by weight |
|---|---|
| Methylene chloride | 85.78 |
| Paraffin | 2.57 |
| Methyl cellulose | 0.95 |
| Acetic acid (glacial) | 0.63 |
| Formic acid (90%) | 0.77 |
| Methanol | 6.10 | and the balance dodecylbenzene sodium sulfonate, the latter sulfonate containing sufficient water which together with the water content of said formic acid ingredient, is equal to 0.717% of the total composition.

LESTER E. KUENTZEL.

REFERENCES CITED

The following references are of record in the file of this patent:

UNITED STATES PATENTS

| Number | Name | Date |
|---|---|---|
| 1,095,270 | Ellis | May 5, 1914 |
| 1,147,849 | Ellis | July 27, 1915 |
| 1,147,850 | Ellis | July 27, 1915 |
| 1,918,224 | Wilson | July 11, 1933 |
| 2,166,476 | Neilson | July 18, 1939 |
| 2,327,701 | Ellis | Aug. 24, 1943 |
| 2,418,138 | Packer | Apr. 1, 1947 |

FOREIGN PATENTS

| Number | Country | Date |
|---|---|---|
| 485,857 | Great Britain | May 20, 1918 |

OTHER REFERENCES

Bennett: Chemical Formulary, vol. 1 (1933), page 385.

Synthetic Organic Chemicals, Carbide and Carbon Chemical Corporation, N. Y., 10th ed. (1940), page 52.